(12) United States Patent
Kim et al.

(10) Patent No.: US 9,604,643 B1
(45) Date of Patent: Mar. 28, 2017

(54) SYSTEM AND METHOD FOR CONTROLLING DRIVING OF VEHICLE

(71) Applicant: Hyundai Motor Company, Seoul (KR)

(72) Inventors: Jin Sung Kim, Gyeonggi-do (KR); Ju Hyun Nam, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/050,560

(22) Filed: Feb. 23, 2016

(30) Foreign Application Priority Data

Oct. 27, 2015 (KR) .................. 10-2015-0149259

(51) Int. Cl.
 *B60W 30/18* (2012.01)
(52) U.S. Cl.
 CPC ............ *B60W 30/18063* (2013.01); *B60W 2510/0638* (2013.01)
(58) Field of Classification Search
 None
 See application file for complete search history.

(56) References Cited

U.S. PATENT DOCUMENTS

2014/0195129 A1   7/2014   Hultengren et al.

FOREIGN PATENT DOCUMENTS

| JP | 2007-192276 A | 8/2007 |
|---|---|---|
| JP | 2012-091601 A | 5/2012 |
| JP | 2016-013762 A | 1/2016 |
| KR | 2014-0039811 A | 4/2014 |
| KR | 10-1393882 B1 | 5/2014 |
| KR | 10-2014-0134405 A | 11/2014 |
| KR | 2015-0008254 A | 1/2015 |

*Primary Examiner* — Thomas Tarcza
*Assistant Examiner* — Garrett Evans
(74) *Attorney, Agent, or Firm* — Mintz Levin Cohn Ferris Glovsky and Popeo, P.C.; Peter F. Corless

(57) ABSTRACT

A system and method for controlling driving of a vehicle is provided. The method includes initiating a creep entry by determining whether the vehicle is driven at a low speed that is equal to or less than creep speed during a stop of the vehicle and initiating control in a creep mode. A launch entry is initiated by determining whether both an APS condition in which an APS is equal to or greater than a reference APS in a creep mode and an engine torque condition that an engine torque is equal to or greater than a reference engine torque are satisfied and converting a current mode into an launch mode. A tip-out entry is initiated by determining whether an APS is less than the reference APS in a launch mode and converting a current mode into a tip-out mode for gradually reducing the engine torque.

10 Claims, 5 Drawing Sheets

SYSTEM AND METHOD FOR CONTROLLING DRIVING OF VEHICLE

CROSS REFERENCE TO RELATED APPLICATION

This application claims the benefit of Korean Patent Application No. 10-2015-0149259, filed on Oct. 27, 2015, which is hereby incorporated by reference in its entirety into this application.

BACKGROUND

1. Technical Field

The present invention relates to a system and method for controlling driving of a vehicle, and more particularly, to a technology for controlling a take-up mode as a low speed driving mode of a vehicle including start, creep, and launch of the vehicle.

2. Description of the Related Art

As in known in the field of art, creep of a vehicle is a mode in which the vehicle is driven with low speed of about 5 KPH when an acceleration pedal and a brake pedal are disengaged while a transmission lever is selected as a drive (D) or reverse R range. Additionally, launch of a vehicle is a mode in which the vehicle is accelerated during synchronization of clutch speed with engine speed through sleep control of the clutch while specific engine speed determined based on an engine driving point of idle speed or more is maintained from a clutch release state of stop or low speed. Take-up is interpreted as including start and low speed driving modes of the vehicle, such as creep and launch and is embodied through sleep control of the clutch in a vehicle including a dry clutch.

An engine exhibits a behavior of an engine torque, which is varied based on a vehicle state and external environment of the engine due to the characteristic of internal combustion engine. A dry clutch used for automatic manual transmission (AMT) or dual clutch transmission (DCT) does not absorb the torque variation sufficiently compared to a torque converter used in a conventional automatic transmission, and thus causing difficulty in performing take-up control of the vehicle with stable performance with respect to the above torque variation, engine speed change, and so on.

The description of the related art is merely to facilitate the understanding of the present invention and is not to be construed as conventional arts that are already known to those of ordinary skill in the art.

SUMMARY

An object of the present invention is to provide a system and method for controlling driving of a vehicle that achieves constant and stable take-up control with respect to change in engine speed and torque, thereby enhancing the productivity of the vehicle, with regard to a vehicle including a dry clutch.

According to an exemplary embodiment of the present invention, a method for controlling driving of a vehicle may include a creep entry process for determining whether the vehicle is driven at a low speed that is equal to or less than creep speed during stop of the vehicle and initiating control in a creep mode by a controller, a launch entry process for determining whether both an accelerator position sensor (APS) condition that an APS is equal to or greater than a reference APS in a creep mode and an engine torque condition that an engine torque is equal to or greater than a reference engine torque are satisfied and converting a current mode into an launch mode by the controller, and a tip-out entry process for determining whether an APS is less than the reference APS in a launch mode and converting a current mode into a tip-out mode for gradually reducing the engine torque by the controller.

In particular, the creep entry process may be executed by the controller even when an APS is 0 and a brake is off (e.g., disengaged) in the tip-out mode, the launch entry process may be executed by the controller when both the APS condition and the engine torque condition are satisfied even in the tip-out mode, and the launch mode may be executed by the controller in response to determining that a first sleep condition that a sleep amount of a clutch is less than a first reference sleep value and a time maintain condition that a state in which the first sleep condition is satisfied is maintained for reference time or more are satisfied.

After the launch entry process is initiated, the launch mode may be sequentially divided into four parts of an engine torque increase part, an engine speed increase part, an engine speed hold part, and a sleep termination part, conversion may be performed between corresponding parts based on whether conversion conditions are satisfied, and the conversion condition may be configured to determine at least one of an APS signal, an engine torque, engine speed, an engine speed variation amount, and a clutch sleep amount.

A conversion condition into the engine torque increase part may be an AND condition in which both of the APS condition and the engine torque condition as a condition of the launch entry process are satisfied, a conversion condition into the engine speed increase part may be an OR condition in which one of an engine speed variation amount condition regarding whether an engine speed variation amount is equal to or greater than a reference speed variation amount, an engine speed condition regarding whether engine speed is equal to or greater than reference speed, and a second sleep condition regarding whether clutch speed amount is less than a second reference sleep value is satisfied. Additionally, a conversion condition into the engine speed hold part may be an OR condition in which one of the engine speed condition and the second sleep condition is satisfied, and a conversion condition into the sleep termination part may be the second sleep condition.

The reference APS and the reference engine torque may each be determined as a single constant, the reference engine speed variation amount may be determined as a two-dimensional (2D) map determined based on an APS and engine speed, the reference engine speed may be determined as a map for an APS, and the second reference sleep value may be determined according to a map based on a current sleep amount. A first reference sleep value of the first sleep condition may be determined as a single constant less than the second reference sleep value, and a reference time of the time maintain condition may be determined as a single constant.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
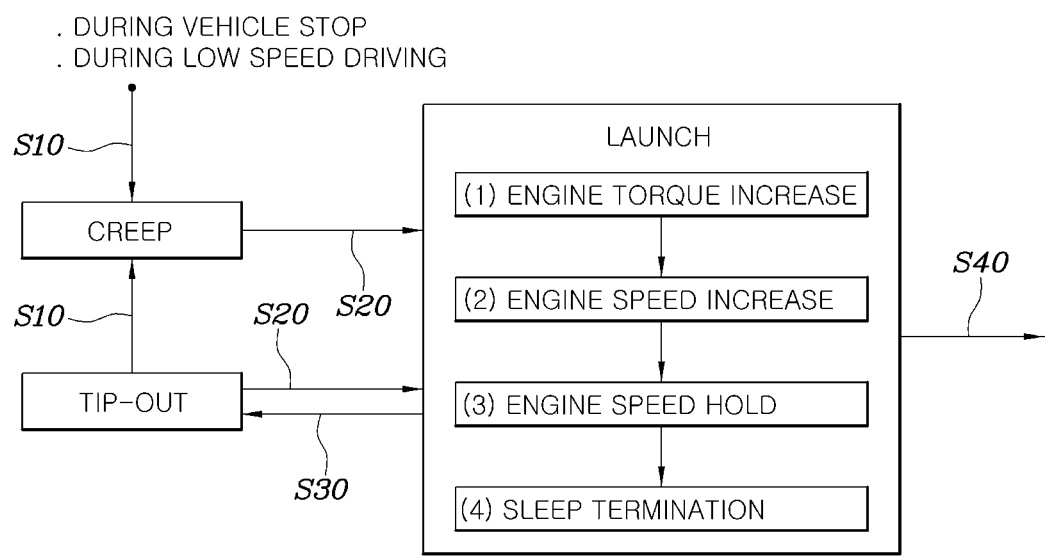
FIG. 1 is a block diagram illustrating a method for controlling driving of a vehicle according to an exemplary embodiment of the present invention.
Figure 2:
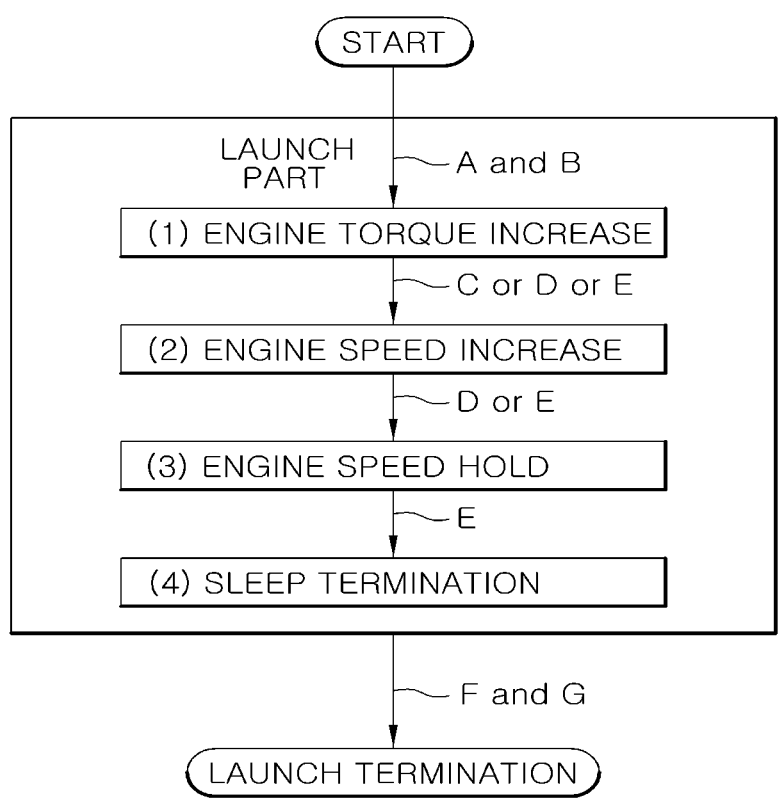
FIG. 2 is a block diagram illustrating a transition condition for each part of a launch mode vehicle according to an exemplary embodiment of the present invention.
Figure 3:
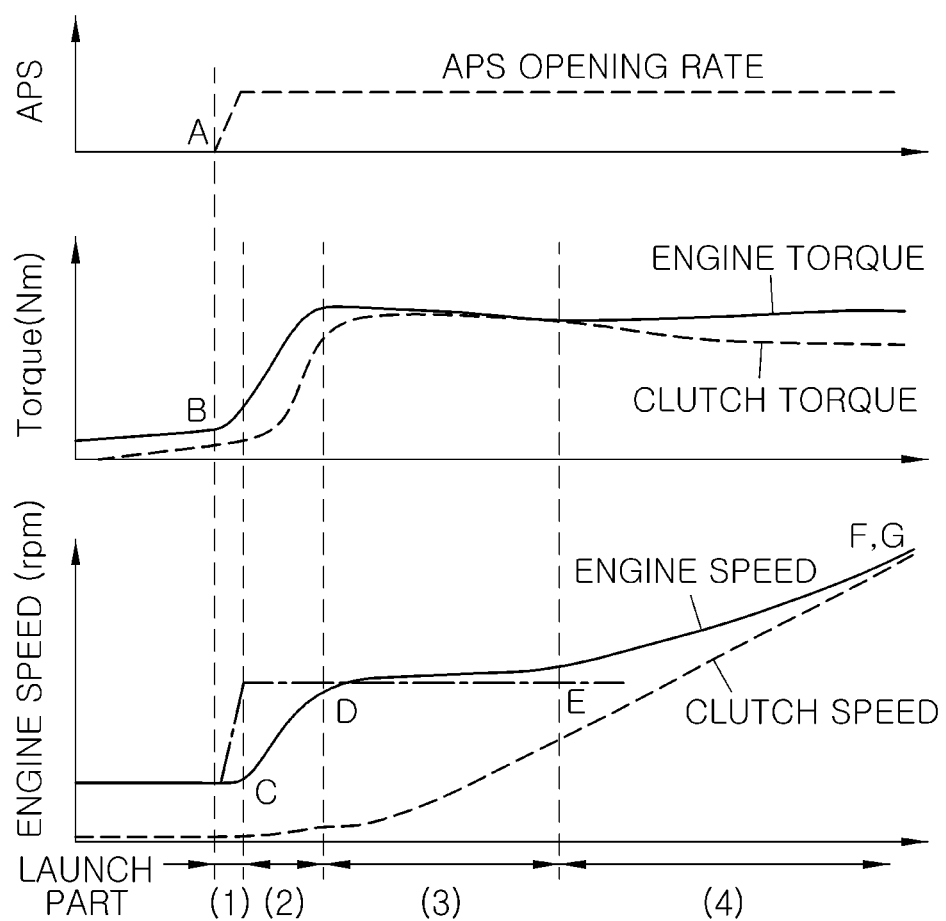
FIG. 3 is a graph illustrating a transition process for each part of a launch mode vehicle according to an exemplary embodiment of the present invention.

Referring to FIGS. 1 to 3, a method for controlling driving of a vehicle according to an exemplary embodiment of the present invention may include a creep entry process S10 for determining whether a vehicle is driven at low speed that is equal to or less than creep speed during stop of the vehicle and initiating control in a creep mode; a launch entry process S20 for determining whether both an accelerator position sensor (APS) condition that an APS is equal to or greater than a reference APS in a creep mode and an engine torque condition that an engine torque is equal to or greater than a reference engine torque are satisfied and converting a current mode into an launch mode; and a tip-out entry process S30 for determining whether an APS is less than the reference APS in a launch mode and converting a current mode into a tip-out mode for gradually reducing the engine torque.

Particularly, an accelerator position sensor (APS) may refer to a signal value of an acceleration pedal sensor and may be substantially interpreted as representing an acceleration pedal manipulation amount of a driver (e.g., an acceleration pedal engagement amount or degree). The creep speed may be about 5 KPH. The controller may be configured to execute the creep entry process S10 even when an APS is 0 and a brake is off (e.g., disengaged) in the tip-out mode, perform the launch entry process S20 when both the APS condition A and the engine torque condition B are satisfied even in the tip-out mode, and terminate the launch mode in response to determining that a first sleep condition F that a sleep amount of a clutch is less than a first reference sleep value and a time maintain condition G that a state in which the first sleep condition is satisfied is maintained for reference time or more are satisfied (S40).

In other words, a state of take-up control of the vehicle may be classified as three modes of the creep mode, the launch mode, and the tip-out mode. In this regard, conditions for entry into each of these modes may be specified as described above, and thus the controller may be configured to automatically operate the vehicle in one of the three modes based on a change in a driving situation of the vehicle and operate the vehicle to complete take-up control according to the present invention and to be generally driven when the launch mode is terminated.

According to the present invention, in particular, after the launch entry process is initiated, the launch mode may be sequentially divided into four parts of an engine torque increase part 1, an engine speed increase part 2, an engine speed hold part 3, and a sleep termination part 4, and conversion may be performed between the corresponding parts according to whether conversion conditions are satisfied. Particularly, the conversion condition may be configured to determine at least one state of an APS signal, an engine torque, engine speed, an engine speed variation amount, and a clutch sleep amount.

Further, the engine torque increase part 1 may be a part in which an engine torque begins to be increased based on an acceleration pedal manipulation amount of a driver (e.g., the amount of pressure exerted onto the pedal), the engine speed increase part 2 may be a part in which engine speed may be increased to target speed determined based on the acceleration pedal manipulation amount of the driver according to the increased engine torque, the engine speed hold part 3 may be a part in which a clutch is gradually connected to increase the clutch speed toward engine speed while the engine speed is maintained as the target speed, and the sleep termination part 4 may be a part in which the clutch is connected while slightly increasing the engine speed when a difference between the clutch speed and the engine speed, that is, a clutch sleep amount is reduced to below a second reference sleep value, to be described later.

The conversion condition into the engine torque increase part 1 may be an AND condition in which both of the APS condition A and the engine torque condition B as a condition of the launch entry process are satisfied. In other words, since a condition itself of the launch entry process corresponds to entry into a launch mode, when the APS is equal to or greater than the reference APS and the engine torque is equal to or greater than a reference engine torque, the controller may be configured to determine that a current mode enters an engine torque increase part. Here, the reference APS may be 0 and the reference engine torque may be set as about 5 Nm to detect a state in which an engine substantially generates a torque based on driver manipulation of an acceleration pedal.

A conversion condition into the engine speed increase part 2 may be an OR condition in which one of an engine speed variation amount condition C regarding whether an engine speed variation amount is equal to or greater than a reference speed variation amount, an engine speed condition D regarding whether engine speed is equal to or greater than reference speed, and a second sleep condition E about whether clutch speed amount is less than a second reference sleep value is satisfied, a conversion condition into the engine speed hold part 3 may be an OR condition in which one of the engine speed condition D and the second sleep condition E is satisfied, and a conversion condition into the sleep termination part 4 may be the second sleep condition E.

In other words, after a current mode enters the engine torque increase part 1, transition into the respective parts may be different based on the engine speed variation amount condition C, the engine speed condition D, and the second sleep condition E. As a result, when the second sleep condition E is satisfied, a current mode may directly enter the sleep termination part 4 without execution of the intermediate engine speed increase part 2 and engine speed hold part 3, when the engine speed condition D is satisfied, the current mode may enter the engine speed hold part 3 without execution of the engine speed increase part 2, and when only the engine speed variation amount condition C is satisfied, the current mode may enter the engine speed increase part 2. Thus, since cases that satisfy the above conditions may be different based on a vehicle driving situation when a vehicle enters a launch mode, flexible launch control in a consistent and stable state may be achieved with respect to the various conditions.

The reference APS and the reference engine torque may each be determined as a single constant, as described above, the reference engine speed variation amount may be determined as a 2D map that is determined according to an APS and engine speed, and the reference engine speed may be determined as a map for an APS. The second reference sleep value may be determined according to a map based on a sleep variation amount. Accordingly, a second reference sleep value may be obtained from the map according to a current sleep variation amount, and when the current sleep amount is less than the obtained second reference sleep value, the controller may be configured to determine that the second sleep condition E is satisfied.

Particularly, the maps may be preset or predetermined via a plurality of test and analysis operations based on a situation of each vehicle type according to necessity of a launch mode control situation of the above vehicle. In addition, a first reference sleep value of the first sleep condition F may be determined as a single constant less than the second reference sleep value and determined as a minimal value less than several tens of revolutions per minute (RPM) to determine whether a clutch is completely connected, and a reference time of the time maintain condition G may also be determined as a single constant that is determined in terms of design via analysis and tests to ensure complete connection of a clutch and determined as a value within several seconds.

Figure 4:
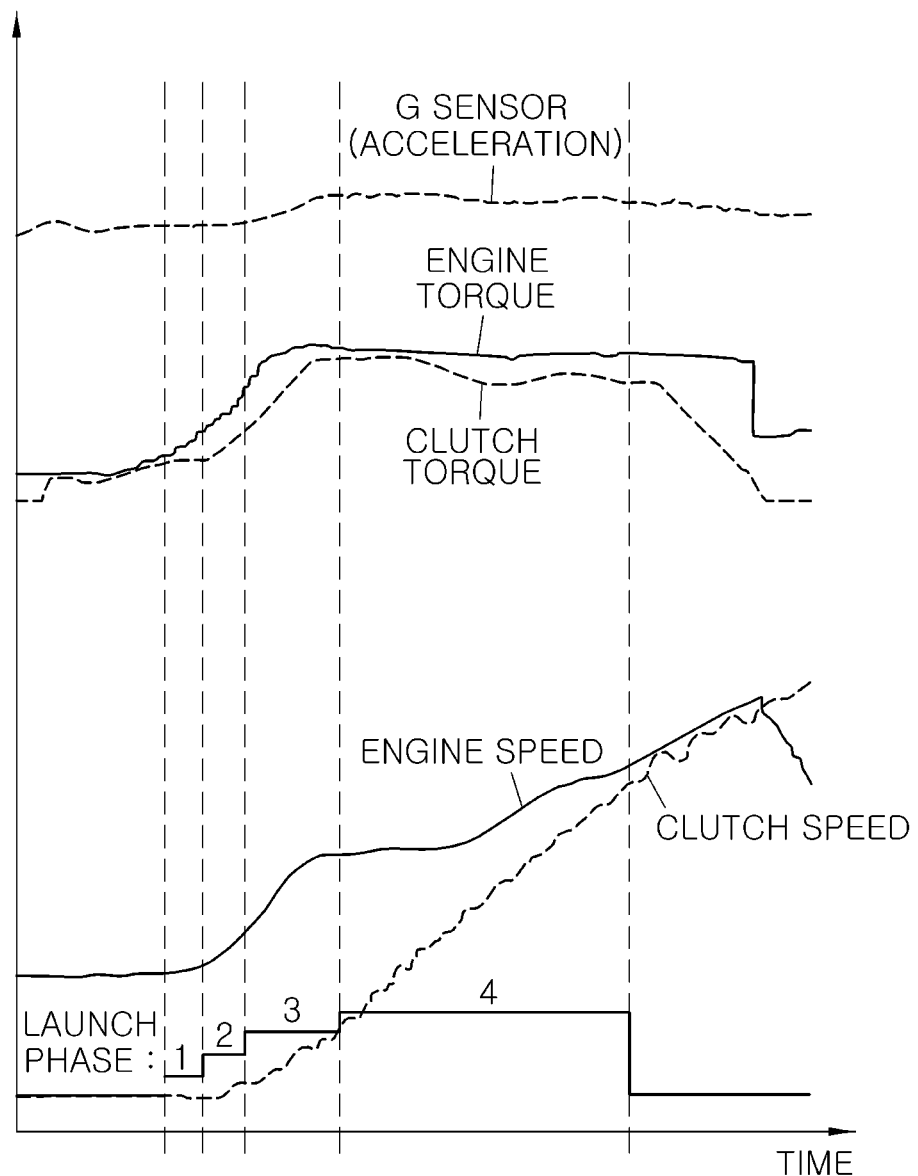
FIG. 4 is a graph illustrating a launch process during acceleration pedal manipulation with an APS of 25% in a stop state according to an exemplary embodiment of the present invention.

Operations according to the present invention configured as described above will now be described according to various driving situations of vehicles. According to the above transition control for each respective part of a launch mode, general launch in which a vehicle starts in a stop state (e.g., the vehicle is started after having been stopped) may sequentially execute the engine torque increase part 1, the engine speed increase part 2, the engine speed hold part 3, and the sleep termination part 4 over time, as illustrated in FIG. 4.

For example, when an APS signal of about 10% is generated by engaging an acceleration pedal while the vehicle is being driven in a creep mode at speed of about 4 to 5 KPH, the launch entry process S20 may be initiated by the controller for the vehicle to enter a launch mode, the sleep termination part 4 may directly performed using the engine torque increase part 1 and the engine speed increase part 2 to achieve a smoother acceleration change. In this regard, since the vehicle may be driven in a creep mode, when the vehicle is driven using the engine torque increase part 1 and the engine speed increase part 2, a sleep amount of the clutch may already be less than the second reference sleep value. Accordingly, operation of the sleep termination part 4 may be directly performed to more smoothly and rapidly complete launch control.

When a vehicle is launched or started on a downhill road, vehicle speed may increase without engine power, and clutch sleep may be less than the second reference sleep value with a minimal engine torque, and thus in this case, after the engine torque increase part 1 is performed, the vehicle may be directly transitioned into the sleep termination part 4 to complete rapid and stable launch control.

In the above control method according to the present invention, in particular, the launch mode may be divided into the four parts with a temporal order and may be sequentially controlled according to the above conversion conditions, conversion into a relatively preceding part may not be performed, an intermediate part may be passed directly when a condition of a relatively subsequent part is satisfied, and accordingly, when a clutch is completely connected, the launch mode may be rapidly terminated irrespective of a current part, thereby achieving flexible launch control of the vehicle while rapidly and more stably forming smooth acceleration sense in the a more appropriate form with respect to various launch start conditions of vehicles.

According to the present invention, with regard to a vehicle including a dry clutch, constant and more stable take-up control may be always achieved with respect to change in engine speed and torque, thereby enhancing the productivity of the vehicle. In particular, despite various initial conditions at launch start of the vehicle, stable launch control performance may be provided.

Figure 5:
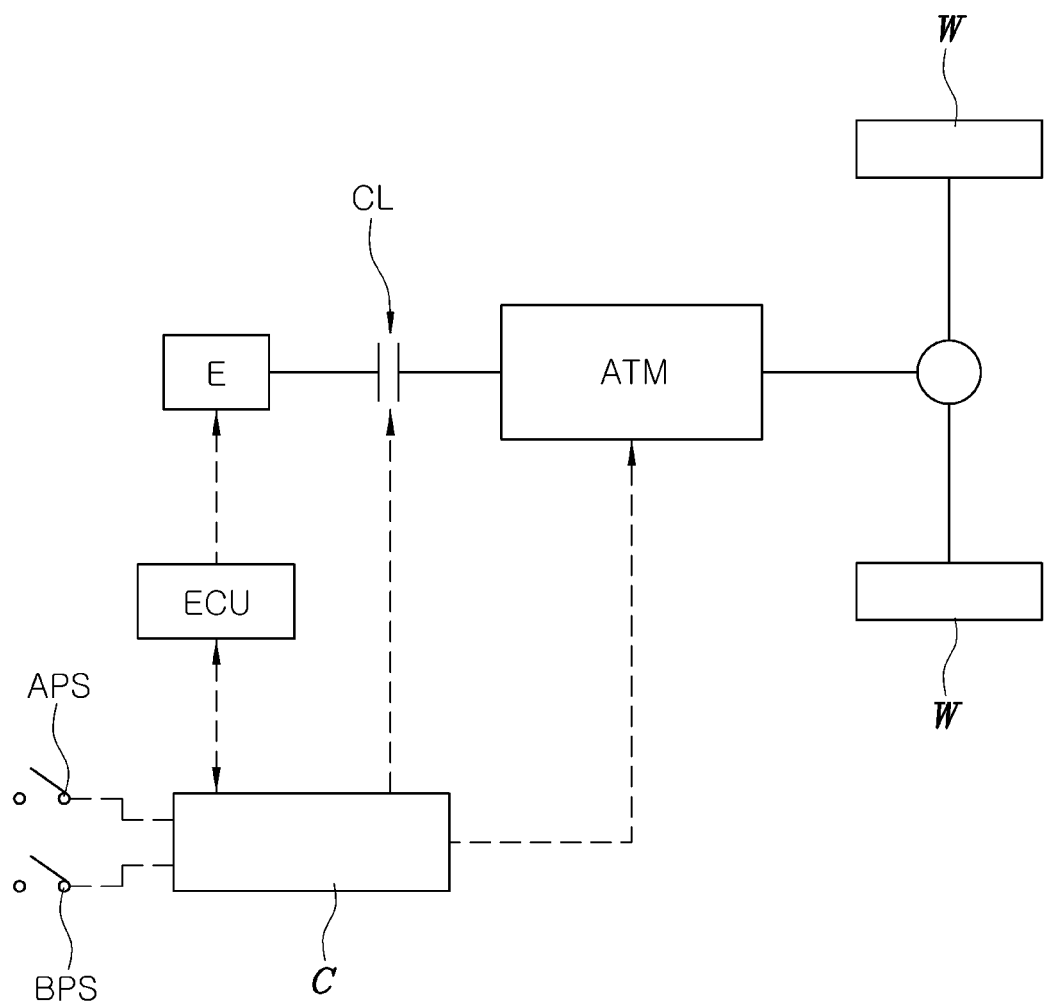
FIG. 5 is a schematic diagram of a vehicle that can be applied to the present invention.

The above mentioned present invention can be applied to a vehicle depicted in FIG. 5. The vehicle has an engine E providing power to an Automated Manual Transmission AMT via a clutch CL. The power from the transmission AMT flows to driving wheels W to drive the vehicle. A controller C controls the clutch CL and the transmission AMT to drive the vehicle in accordance with driving condition of the vehicle. The controller C is connected to an accelerator pedal sensor APS and a brake pedal sensor BPS to receive driver's manipulations. Further, the controller C is linked to an Engine Control Unit ECU controlling the engine E so that the controller C is able to control the engine E indirectly. Here, actuators for the clutch CL and the transmission AMT are omitted.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling driving of a vehicle, comprising:

initiating, by a controller, a creep entry by determining whether the vehicle is driven at a low speed equal to or less than a creep speed during a stop of the vehicle and initiating control in a creep mode;

initiating, by the controller, a launch entry by determining whether both an accelerator position sensor (APS) condition that an APS is equal to or greater than a reference APS in a creep mode and an engine torque condition that an engine torque is equal to or greater than a reference engine torque are satisfied and converting a current mode into an launch mode; and initiating, by the controller, a tip-out entry by determining whether an APS is less than the reference APS in a launch mode and converting a current mode into a tip-out mode for gradually reducing the engine torque, wherein the creep entry is initiated even when an APS is 0 and a brake is disengaged in the tip-out mode, wherein the launch entry is initiated when both the APS condition and the engine torque condition are satisfied even in the tip-out mode, and wherein the launch mode is terminated in response to determining that a first sleep condition that a sleep amount of a clutch is less than a first reference sleep value and a time maintain condition that a state in which the first sleep condition is satisfied is maintained for reference time or more are satisfied.

2. The method of claim 1, wherein after the launch entry is initiated, the launch mode is sequentially divided into four parts of an engine torque increase part, an engine speed increase part, an engine speed hold part, and a sleep termination part, conversion is performed between corresponding parts based on whether conversion conditions are satisfied; and the conversion condition is configured to determine at least one state of an APS signal, an engine torque, engine speed, an engine speed variation amount, and a clutch sleep amount.

3. The method of claim 2, wherein:

a conversion condition into the engine torque increase part is an AND condition in which both of the APS condition and the engine torque condition as a condition of the launch entry initiation are satisfied;

a conversion condition into the engine speed increase part is an OR condition in which one of an engine speed variation amount condition regarding whether an engine speed variation amount is equal to or greater than a reference speed variation amount, an engine speed condition regarding whether engine speed is equal to or greater than reference speed, and a second sleep condition regarding whether clutch speed amount is less than a second reference sleep value is satisfied;

a conversion condition into the engine speed hold part is an OR condition in which one of the engine speed condition and the second sleep condition is satisfied; and a conversion condition into the sleep termination part is the second sleep condition.

4. The method of claim 3, wherein:

the reference APS and the reference engine torque are each determined as a single constant;

the reference engine speed variation amount is determined as a two-dimensional (2D) map determined based on an APS and engine speed;

the reference engine speed is determined as a map for the APS; and the second reference sleep value is determined according to a map based on a sleep variation amount.

5. The method of claim 4, wherein:

a reference sleep value of the first sleep condition is determined as a single constant less than the second reference sleep value; and a first reference time of the time maintain condition is determined as a single constant.

6. A system for controlling driving of a vehicle, comprising:

a memory configured to store program instructions; and a processor configured to execute the program instructions, the program instructions when executed configured to:

initiate a creep entry by determining whether the vehicle is driven at a low speed equal to or less than a creep speed during a stop of the vehicle and initiating control in a creep mode;

initiate a launch entry by determining whether both an accelerator position sensor (APS) condition that an APS is equal to or greater than a reference APS in a creep mode and an engine torque condition that an engine torque is equal to or greater than a reference engine torque are satisfied and converting a current mode into an launch mode; and initiate a tip-out entry by determining whether an APS is less than the reference APS in a launch mode and converting a current mode into a tip-out mode for gradually reducing the engine torque, wherein the creep entry is initiated even when an APS is 0 and a brake is disengaged in the tip-out mode, wherein the launch entry is initiated when both the APS condition and the engine torque condition are satisfied even in the tip-out mode, and wherein the launch mode is terminated in response to determining that a first sleep condition that a sleep amount of a clutch is less than a first reference sleep value and a time maintain condition that a state in which the first sleep condition is satisfied is maintained for reference time or more are satisfied.

7. The system of claim 6, wherein after the launch entry is initiated, the launch mode is sequentially divided into four parts of an engine torque increase part, an engine speed increase part, an engine speed hold part, and a sleep termination part, conversion is performed between corresponding parts based on whether conversion conditions are satisfied; and the conversion condition is configured to determine at least one state of an APS signal, an engine torque, engine speed, an engine speed variation amount, and a clutch sleep amount.

8. The system of claim 7, wherein:

a conversion condition into the engine torque increase part is an AND condition in which both of the APS condition and the engine torque condition as a condition of the launch entry initiation are satisfied;

a conversion condition into the engine speed increase part is an OR condition in which one of an engine speed variation amount condition regarding whether an engine speed variation amount is equal to or greater than a reference speed variation amount, an engine speed condition regarding whether engine speed is equal to or greater than reference speed, and a second sleep condition regarding whether clutch speed amount is less than a second reference sleep value is satisfied;

a conversion condition into the engine speed hold part is an OR condition in which one of the engine speed condition and the second sleep condition is satisfied; and a conversion condition into the sleep termination part is the second sleep condition.

9. The system of claim 8, wherein:

the reference APS and the reference engine torque are each determined as a single constant;

the reference engine speed variation amount is determined as a two-dimensional (2D) map determined based on an APS and engine speed;

the reference engine speed is determined as a map for the APS; and the second reference sleep value is determined according to a map based on a sleep variation amount.

10. The system of claim 9, wherein:

a reference sleep value of the first sleep condition is determined as a single constant less than the second reference sleep value; and a first reference time of the time maintain condition is determined as a single constant.

* * * * *